US012720303B2

(12) United States Patent
Mohan Raj et al.

(10) Patent No.: US 12,720,303 B2
(45) Date of Patent: Aug. 25, 2026

(54) METHODS, SYSTEMS, AND COMPUTER READABLE MEDIA FOR DETECTING AND PROCESSING INTER-PUBLIC LAND MOBILE NETWORK (PLMN) SERVICE-BASED INTERFACE (SBI) MESSAGES WITHOUT 3GPP-SBI-ORIGINATING-NETWORK-ID HEADERS

(71) Applicant: Oracle International Corporation, Redwood Shores, CA (US)

(72) Inventors: John Nirmal Mohan Raj, Bangalore (IN); Sonia Kadyan, New Delhi (IN); Ashish Jyoti Sharma, New Delhi (IN); Jay Rajput, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 294 days.

(21) Appl. No.: 18/414,455

(22) Filed: Jan. 16, 2024

(65) Prior Publication Data

US 2025/0234187 A1 Jul. 17, 2025

(51) Int. Cl.
*H04W 8/26* (2009.01)
*H04W 84/04* (2009.01)

(52) U.S. Cl.
CPC ............ *H04W 8/26* (2013.01); *H04W 84/042* (2013.01)

(58) Field of Classification Search
CPC .............................. H04W 8/26; H04W 84/042
See application file for complete search history.

(56) References Cited

U.S. PATENT DOCUMENTS 10,778,527 B2 9/2020 Assali et al.
11,483,741 B2 10/2022 Nair et al.
(Continued)

FOREIGN PATENT DOCUMENTS

CN 112003912 B 11/2021
CN 120614685 A * 9/2025 ............ H04W 12/69
(Continued)

OTHER PUBLICATIONS

Commonly-Assigned, co-pending U.S. Appl. No. 18/523,487 for "Methods, Systems, and Computer Readable Media for Detecting and Mitigating Security Attacks on Producer Network Functions (NFs) Using Mappings Between Dynamically Assigned Service-Based Interface (SBI) Message Identifiers and Proxy NF Identifiers at Proxy NF" (Unpublished, filed Nov. 29, 2023).
(Continued)

*Primary Examiner* — Charles T Shedrick
(74) *Attorney, Agent, or Firm* — Jenkins, Taylor & Hunt, P.A.

(57) ABSTRACT

A method for detecting and processing egress inter-PLMN SBI request messages without 3gpp-Sbi-Originating-Network-Id headers includes receiving, by a proxy NF serving a plurality of PLMNs, an egress inter-PLMN SBI request message without a 3gpp-Sbi-Originating-Network-Id header. The method further includes determining an originating network identifier from the message, from DNS, or from a database record. The method further includes adding a 3gpp-Originating-Network-Id header to the message, populating the header with the originating network identifier, and forwarding the message to or towards a target PLMN.

16 Claims, 7 Drawing Sheets

(56) References Cited

U.S. PATENT DOCUMENTS 11,533,358 B1 * 12/2022 Khare .................... H04L 67/02
11,553,342 B2 1/2023 Mahalank et al.
11,825,310 B2 11/2023 Rajput et al.
11,876,703 B2 * 1/2024 Bartolome Rodrigo .................... H04L 45/304
12,425,863 B2 * 9/2025 Kadyan ............... H04W 12/122
12,531,894 B2 * 1/2026 Mohan Raj ......... H04L 63/1441
2020/0036754 A1 1/2020 Livanos
2021/0111985 A1 4/2021 Mahalank
2021/0297935 A1 * 9/2021 Belling ................. H04W 40/00
2022/0022040 A1 * 1/2022 Mahalank ............. H04W 12/08
2022/0053372 A1 * 2/2022 Shekhar .................. H04L 67/56
2022/0070648 A1 3/2022 Krishan
2022/0095111 A1 * 3/2022 Fu ..................... H04W 36/0011
2022/0104020 A1 3/2022 Rajput
2022/0159464 A1 * 5/2022 Rajput .................. H04W 48/08
2022/0200847 A1 6/2022 Bartolome Rodrigo
2022/0201487 A1 * 6/2022 Minokuchi ........... H04L 63/166
2022/0247779 A1 * 8/2022 Rajput ................ H04L 63/1458
2022/0272165 A1 * 8/2022 Bawa .................. H04L 61/4541
2022/0287089 A1 * 9/2022 Singh .................... H04W 12/08
2022/0294775 A1 * 9/2022 Singh .................. H04L 63/0815
2022/0295282 A1 * 9/2022 Rajput .................... H04W 8/18
2022/0322053 A1 * 10/2022 Das .................... H04L 41/0893
2022/0353263 A1 11/2022 Choyi et al.
2022/0360447 A1 * 11/2022 Rajput .................. H04L 9/3228
2022/0360989 A1 * 11/2022 Rajput .................. H04W 12/06
2022/0361085 A1 * 11/2022 Rajput .................. H04W 60/00
2023/0007536 A1 * 1/2023 Sharma ................. H04W 24/04
2023/0052658 A1 * 2/2023 Khare ................. H04L 63/0281
2023/0141233 A1 * 5/2023 Pulipati ................. H04W 48/16 726/4
2023/0147549 A1 * 5/2023 Singh .................. H04L 41/5041 709/223
2023/0199497 A1 6/2023 Krishan et al.
2023/0217355 A1 * 7/2023 Srivastava .......... H04L 41/0654 370/329
2023/0284008 A1 9/2023 Muhanna et al.
2023/0291818 A1 * 9/2023 Yang ..................... H04L 67/563
2023/0388230 A1 * 11/2023 Krishan ................ H04L 45/745
2023/0396602 A1 * 12/2023 Wu ....................... H04L 9/3213
2023/0413052 A1 * 12/2023 Aggarwal ........... H04W 12/082
2024/0007858 A1 1/2024 Mohan Raj et al.
2024/0056506 A1 * 2/2024 Bommisetty ......... G06F 21/645
2024/0107299 A1 * 3/2024 Wang .................. H04W 12/043
2024/0129876 A1 4/2024 Sarma
2024/0163661 A1 * 5/2024 Krishan .............. H04L 63/0428
2024/0381224 A1 * 11/2024 Landais ................ H04W 48/02
2024/0406851 A1 * 12/2024 Jayaramachar ....... H04W 48/18
2025/0126475 A1 * 4/2025 Li .......................... H04L 67/51
2025/0175491 A1 5/2025 Mohan Raj et al.
2025/0175800 A1 5/2025 Kadyan et al.
2025/0175801 A1 5/2025 Kadyan et al.
2025/0294358 A1 * 9/2025 Mohan Raj ......... H04W 12/088

FOREIGN PATENT DOCUMENTS

CN 121509976 A * 2/2026 ............. H04W 8/14
EP 4 152 691 A1 3/2023
WO WO-2024/125763 A1 6/2024
WO WO 2025/117125 A1 6/2025

OTHER PUBLICATIONS

Commonly-Assigned, co-pending U.S. Appl. No. 18/523,425 for "Methods, Systems, and Computer Readable Media for Detecting and Mitigating Security Attacks on Producer Network Functions (NFs) Using Access Token to Non-Access-Token Parameter Correlation at Proxy NF" (Unpublished, filed Nov. 29, 2023).

Commonly-Assigned, co-pending U.S. Appl. No. 18/523,322 for "Methods, Systems, and Computer Readable Media for Detecting and Mitigating Security Attacks on Producer Network Functions (NFs) Using Error Response Messages" (Unpublished, filed Nov. 29, 2023).

"3rd Generation Partnership Project; Technical Specification Group Services and System Aspects; System architecture for the 5G System (5GS); Stage 2 (Release 18)" 3GPP TS 23.501, V18.3.0, pp. 1-696 (Sep. 2023).

"3rd Generation Partnership Project; Technical Specification Group Services and System Aspects; Procedures for the 5G System (5GS); Stage 2 (Release 18)" 3GPP TS 23.502, V18.3.0, pp. 1-899 (Sep. 2023).

"3rd Generation Partnership Project; Technical Specification Group Core Network and Terminals; 5G System; Session Management Services; Stage 3 (Release 18)" 3GPP TS 29.502, V18.4.0, pp. 1-355 (Sep. 2023).

3rd Generation Partnership Project; Technical Specification Group Core Network and Terminals; 5G System; Technical Realization of Service Based Architecture; Stage 3 (Release 18) 3GPP TS 29.500 V18.3.0 pp. 1-148 (Sep. 2023).

3rd Generation Partnership Project; Technical Specification Group Core Network and Terminals; 5G System; Network Function Repository Services; Stage 3 (Release 18) 3GPP TS 29.510 V18.4.0 pp. 1-373 (Sep. 2023).

3rd Generation Partnership Project; Technical Specification Group Core Network and Terminals; 5G System; Public Land Mobile Network (PLMN) Interconnection; Stage 3 (Release 18) 3GPP TS 29.573 V18.4.0 pp. 1-116 (Sep. 2023).

3rd Generation Partnership Project; Technical Specification Group Services and System Aspects; Security architecture and procedures for 5G system (Release 18) 3GPP TS 33.501 V18.3.0 pp. 1-322 (Sep. 2023).

3rd Generation Partnership Project; Technical Specification Group Core Network and Terminals; 5G System; Technical Realization of Service Based Architecture; Stage 3 (Release 18) 3GPP TS 29.500 V18.4.0 pp. 1-149 (Dec. 2023).

3rd Generation Partnership Project; Technical Specification Group Core Network and Terminals; 5G System; Network Function Repository Services; Stage 3 (Release 18) 3GPP TS 29.510 V18.5.0, pp. 1-382 (Dec. 2023).

3rd Generation Partnership Project; Technical Specification Group Core Network and Terminals; 5G System; Public Land Mobile Network (PLMN) Interconnection; Stage 3 (Release 18) 3GPP TS 29.573 V18.5.0 pp. 1-130 (Dec. 2023).

3rd Generation Partnership Project; Technical Specification Group Services and System Aspects; Security architecture and procedures for the 5G System; Stage 2 (Release 18) 3GPP TS 33.501 V18.4.0 pp. 1-326 (Dec. 2023).

Keller et al., "Roaming in the 5G System: the 5GS roaming architecture," Ericsson Technology Review Articles (Jun. 17, 2021).

5G Roaming Guidelines, Official Document NG.113—GSM Association Version 2.0, pp. 1-36 (May 28, 2020).

Content for TS 33.501 Word version: 18.4.0, pp. 1-8 (Downloaded Jan. 31, 24) https://www.tech-invite.com/3m33/toc/tinv-3gpp-33-501_e.html.

Commonly-Assigned, co-pending U.S. Appl. No. 18/608,071 for "Methods, Systems, and Computer Readable Media for Filtering Inter-Public Land Mobile Network (PLMN) Messages at Security Edge Protection Proxy (SEPP) to Implement Roaming Agreements" (Unpublished, filed Mar. 18, 2024).

Non-Final Office Action for U.S. Appl. No. 18/523,425 (Jul. 31, 2025).

Notice of Allowance for U.S. Appl. No. 18/523,322 (Jul. 18, 2025).

3rd Generation Partnership Project; Technical Specification Group Services and System Aspects; Security architecture and pocedures, 3GPP Draft: 33501-HAO, 3rd Generation Partnership Project (3GPP) Jun. 22, 2023.

Notification of Transmittal of the International Search Report and the Written Opinion of the International Searching Authority, or the Declaration for International Patent Application Serial No. PCT/US2024/053761 (Feb. 4, 2025).

Notice of Allowance for U.S. Appl. No. 18/523,425 (Dec. 10, 2025).

Tang, "A Systematic Analysis of 5G Networks with a Focus on 5G Core Security", Feb. 10, 2022, IEEE, pp. 18298-18318 (Year 2022).

(56) References Cited

OTHER PUBLICATIONS

Non-Final Office Action for U.S. Appl. No. 18/523,487 (Oct. 23, 2025).

5G; 5G System; Technical Realization of Service Based Architecture; Stage 3, 3GPP TS 29.500, version 17.12.0, Release 17 (Year: 2023).

Non-Final Office Action for U.S. Appl. No. 18/608,071 (May 18, 2026).

* cited by examiner

METHODS, SYSTEMS, AND COMPUTER READABLE MEDIA FOR DETECTING AND PROCESSING INTER-PUBLIC LAND MOBILE NETWORK (PLMN) SERVICE-BASED INTERFACE (SBI) MESSAGES WITHOUT 3GPP-SBI-ORIGINATING-NETWORK-ID HEADERS

TECHNICAL FIELD

The subject matter described herein relates to enhancing inter-PLMN messages. More particularly, the subject matter described herein relates to methods, systems, and computer readable media for determining originating network identifiers for inter-PLMN SBI request messages, adding 3gpp-Sbi-Originating-Network-Id headers to the messages, populating the headers with the originating network identifiers, and forwarding the messages to another PLMN.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

An SCP can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

One problem that can occur in 5G and other types of networks is that messages transmitted between networks may lack one or more parameters needed by the receiving network to screen messages. For example, in 3GPP-compliant networks, messages transmitted between PLMNs may be transmitted from an originating security edge protection proxy (SEPP) to a SEPP associated with the target PLMN. The SEPP associated with the originating network is often referred to as the consumer SEPP or C-SEPP, because the SEPP forwards messages from consumer NFs to other networks. The C-SEPP is also referred to herein as the originating SEPP. The SEPP associated with the target network is often referred to as the producer SEPP or P-SEPP, because the SEPP is associated with the network where the target producer NF resides. It is desirable for the P-SEPP to be able to sufficiently screen messages from other networks. However, messages from other networks often lack sufficient parameters, such as originating network identifying headers, to allow the P-SEPP to screen such messages, and the P-SEPP may then either allow attack traffic into the network or block legitimate traffic from entering the network, depending on the security policy implemented by the P-SEPP.

In hypertext transfer protocol (HTTP) messages communicated between 3GPP-compliant networks, message attributes or parameters are carried in headers that are appended to the messages. One such header is the 3gpp-Sbi-Originating-Network-Id. According to clause 5.2.3.2.15 of 3GPP TS 29.500, the 3GPP-Sbi-Originating-Network-Id header contains the PLMN identity (mobile country code (MCC) and mobile network code (MNC)) of the source PLMN or the standalone non-public network (SNPN) ID (MCC-MNC-NID) of the source SNPN of received HTTP messages. Because the 3GPP-Sbi-Originating-Network-Id header carries source-network identifying information, 3GPP-Sbi-Originating-Network-Id header contents can be used by the P-SEPP to screen messages from other networks.

One problem with relying on the presence of the 3GPP-Sbi-Originating-Network-Id header in messages to screen the messages is that some messages do not include the 3gpp-Sbi-Originating-Network-Id header. 3GPP TS 33.501 indicates that SCPs and SEPPs should add a 3gpp-Sbi-Originating-Network-Id header to a received message that does not include a 3GPP-Sbi-Originating-Network-Id header, if the SCP or SEPP can determine the originating PLMN ID. However, for the case where the SCP or SEPP serves more than one PLMN, the SCP or SEPP may not be able to determine the originating PLMN ID.

Accordingly, in light of these and other difficulties there exists a need for processing received SBI request messages that lack 3gpp-Sbi-Originating-Network-Id headers.

SUMMARY

A method for detecting and processing egress inter-public land mobile network (inter-PLMN) service-based interface (SBI) request messages without 3gpp-Sbi-Originating-Network-Id headers includes receiving, by a proxy NF serving a plurality of PLMNs, an egress inter-PLMN SBI request message. The method further includes determining, by the proxy NF, that the egress inter-PLMN SBI request message does not include a 3gpp-Sbi-Originating-Network-Id header. The method further includes determining, by the proxy NF, whether the egress inter-PLMN SBI request message includes an originating network identifier. The method further includes, when the egress inter-PLMN SBI request message does not include the originating network identifier, obtaining, by the proxy NF and using a domain name system (DNS) or a database record including a mapping between a dynamically assigned SBI message identifier and the originating network identifier, the originating network identifier. The method further includes, when the egress inter-PLMN SBI request message includes the originating network identifier, obtaining, by the proxy NF and from the message, the originating network identifier. The method further includes adding, by the proxy NF, a 3gpp-Sbi-Originating-Network-Id header to the egress inter-PLMN SBI request message and populating the 3gpp-Sbi-Originating-Network-Id header with the originating network identifier. The method further includes forwarding, by the proxy NF, the egress inter-PLMN SBI request message to or towards a target PLMN.

According to another aspect of the subject matter described herein, receiving the egress inter-PLMN SBI request message includes receiving an egress inter-PLMN NF discovery request message, determining whether the egress inter-PLMN SBI request message includes an originating network identifier includes determining that the egress inter-PLMN NF discovery request message does not include an originating network identifier, and obtaining the originating network identifier using the DNS or the database record includes obtaining the originating network identifier using the DNS.

According to another aspect of the subject matter described herein, obtaining the originating network identifier using the DNS includes sending, by the proxy NF, a plurality of different DNS queries to a DNS server, where each of the DNS queries includes a network identifier of the PLMNs served by the proxy NF and an NF identifier and receiving a success response to one of the queries and obtaining the originating network identifier includes treating the network identifier included in the query that resulted in the success response as the originating network identifier.

According to another aspect of the subject matter described herein, the identifier for the NF included in the DNS queries includes an identifier for an NF repository function (NRF).

According to another aspect of the subject matter described herein, obtaining the originating network identifier using the DNS or the database record includes obtaining the originating network identifier using the database record.

According to another aspect of the subject matter described herein, obtaining the originating network identifier using the database record includes obtaining the dynamically assigned SBI message identifier from the egress inter-PLMN SBI request message, and performing a lookup in a database maintained by the proxy NF using the dynamically assigned SBI message identifier.

According to another aspect of the subject matter described herein, the method for processing egress inter-PLMN SBI request messages includes creating, by the proxy NF, the database record including the mapping prior to receiving the egress inter-PLMN SBI request message.

According to another aspect of the subject matter described herein, creating the database record including the mapping comprises receiving a response message from a producer NF, obtaining the dynamically assigned SBI message identifier from the response message, and storing the SBI message identifier and the originating network identifier in the database maintained by the proxy NF.

According to another aspect of the subject matter described herein, the proxy NF comprises a security edge protection proxy (SEPP), a service communication proxy (SCP), or a roaming hub.

According to another aspect of the subject matter described herein, the proxy NF comprises an originating SEPP and forwarding the egress inter-PLMN SBI request message to or towards the target PLMN includes forwarding the egress inter-PLMN SBI request message to a SEPP associated with the target PLMN.

According to another aspect of the subject matter described herein, a system for detecting and processing egress inter-public land mobile network (inter-PLMN) service-based interface (SBI) request messages without 3gpp-Sbi-Originating-Network-Id headers is provided. The system includes a proxy NF configured to serve a plurality of PLMNs and including at least one processor and a memory. The system further includes an egress SBI request message manager implemented by the at least one processor for receiving an egress inter-PLMN SBI request message, determining that the egress inter-PLMN SBI request message does not include a 3gpp-Sbi-Originating-Network-Id header, determining whether the egress inter-PLMN SBI request message includes an originating network identifier, when the egress inter-PLMN SBI request message does not include the originating network identifier, obtaining, by the proxy NF and using a domain name system (DNS) or a database record including a mapping between a dynamically assigned SBI message identifier and the originating network identifier, the originating network identifier, when the egress inter-PLMN SBI request message includes the originating network identifier, obtaining, by the proxy NF and from the message, the originating network identifier, adding, by the proxy NF, a 3gpp-Sbi-Originating-Network-Id header to the egress inter-PLMN SBI request message and populating the 3gpp-Sbi-Originating-Network-Id header with the originating network identifier, and forwarding, by the proxy NF, the inter-PLMN SBI request message to or towards a target PLMN.

According to another aspect of the subject matter described herein, the egress inter-PLMN SBI request message includes an egress inter-PLMN NF discovery request message, the egress SBI request message manager determines that the egress inter-PLMN NF discovery request message does not include an originating network identifier, and the egress SBI request message manager obtains the originating network identifier using the DNS.

According to another aspect of the subject matter described herein, in obtaining the originating network identifier using the DNS, the egress SBI request message manager is configured to send a plurality of different DNS queries to a DNS server, where each of the DNS queries includes a network identifier of the PLMNs served by the proxy NF and an NF identifier, and receive a success response to one of the queries and obtaining the originating network identifier includes treating the network identifier included in the query that resulted in the success response as the originating network identifier.

According to another aspect of the subject matter described herein, the identifier for the NF included in the DNS queries includes an identifier for an NF repository function (NRF).

According to another aspect of the subject matter described herein, the egress SBI request message manager is configured to obtain the originating network identifier using the database record.

According to another aspect of the subject matter described herein, in obtaining the originating network identifier using the database record, the egress SBI request message manager is configured to obtain the dynamically assigned SBI message identifier from the egress inter-PLMN SBI request message and perform a lookup in a database maintained by the proxy NF using the dynamically assigned SBI message identifier.

According to another aspect of the subject matter described herein, the egress SBI request message manager is configured to create the database record including the mapping prior to receiving the egress inter-PLMN SBI request message.

According to another aspect of the subject matter described herein, in creating the database record, the egress SBI request message manager is configured to receive a response message from a producer NF, obtaining the dynamically assigned SBI message identifier from the response message and store the SBI message identifier and the originating network identifier in the database maintained by the proxy NF.

According to another aspect of the subject matter described herein, a non-transitory computer readable medium having stored thereon executable instructions that when executed by a processor of a computer control the computer to perform steps is provided. The steps include receiving, by a proxy network function (NF) serving a plurality of public land mobile networks (PLMNs), an egress inter-PLMN service-based interface (SBI) request message. The steps further include determining, by the proxy NF, that the egress inter-PLMN SBI request message does not include a 3gpp-Sbi-Originating-Network-Id header. The steps further include determining, by the proxy NF, whether the egress inter-PLMN SBI request message includes an originating network identifier. The steps further include, when the egress inter-PLMN SBI request message does not include the originating network identifier, obtaining, by the proxy NF and using a domain name system (DNS) or a database record including a mapping between a dynamically assigned SBI message identifier and the originating network identifier, the originating network identifier. The steps further include, when the egress inter-PLMN SBI request message includes the originating network identifier, obtaining, by the proxy NF and from the message, the originating network identifier. The steps further include adding, by the proxy NF, a 3gpp-Sbi-Originating-Network-Id header to the egress inter-PLMN SBI request message and populating the 3gpp-Sbi-Originating-Network-Id header with the originating network identifier. The steps further include forwarding, by the proxy NF, the inter-PLMN SBI request message to or towards a target PLMN.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
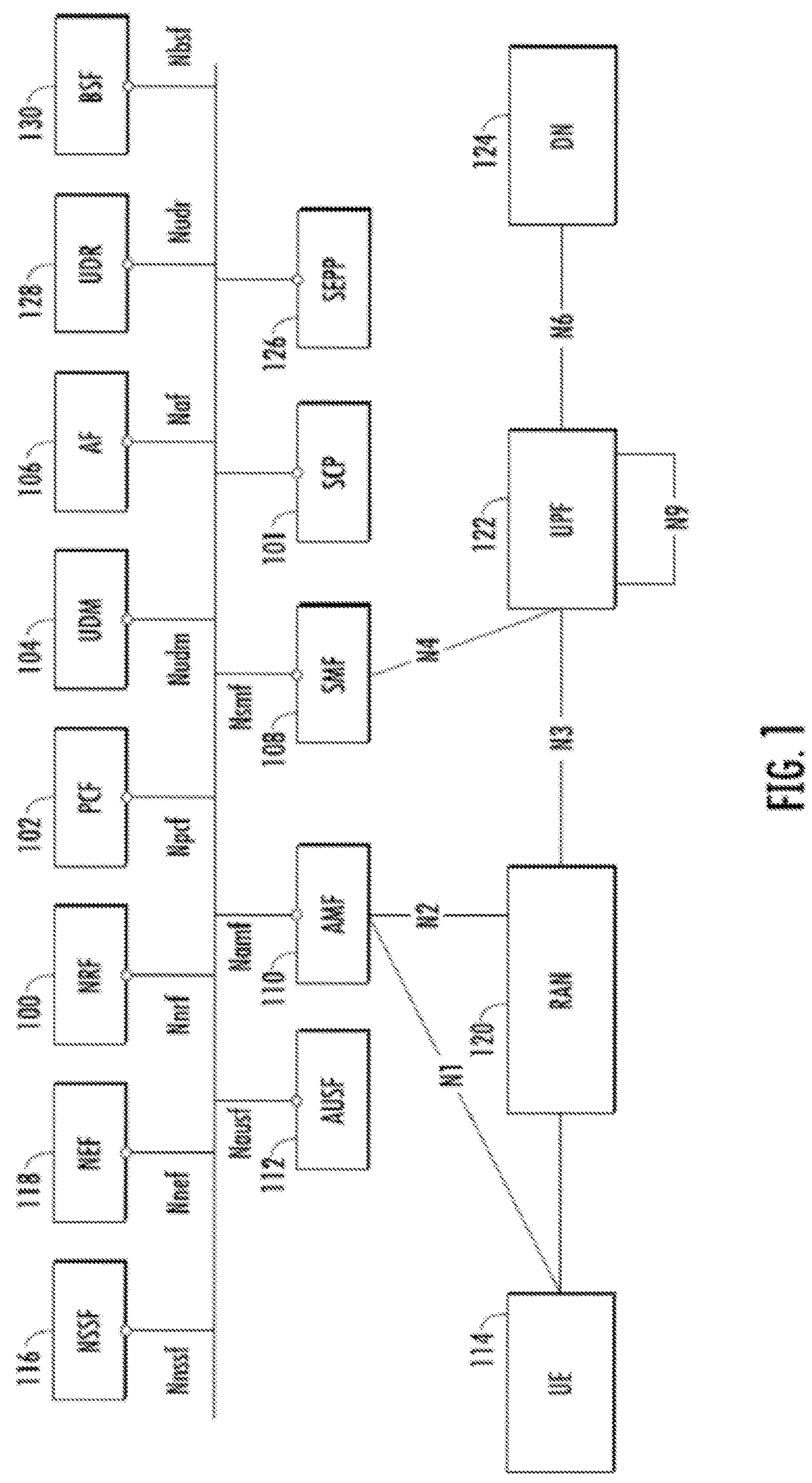
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A unified data repository (UDR) 128 stores subscription data for UEs. A binding support function (BSF) 130 manages bindings between PDU sessions and PCFs.

Figure 2:
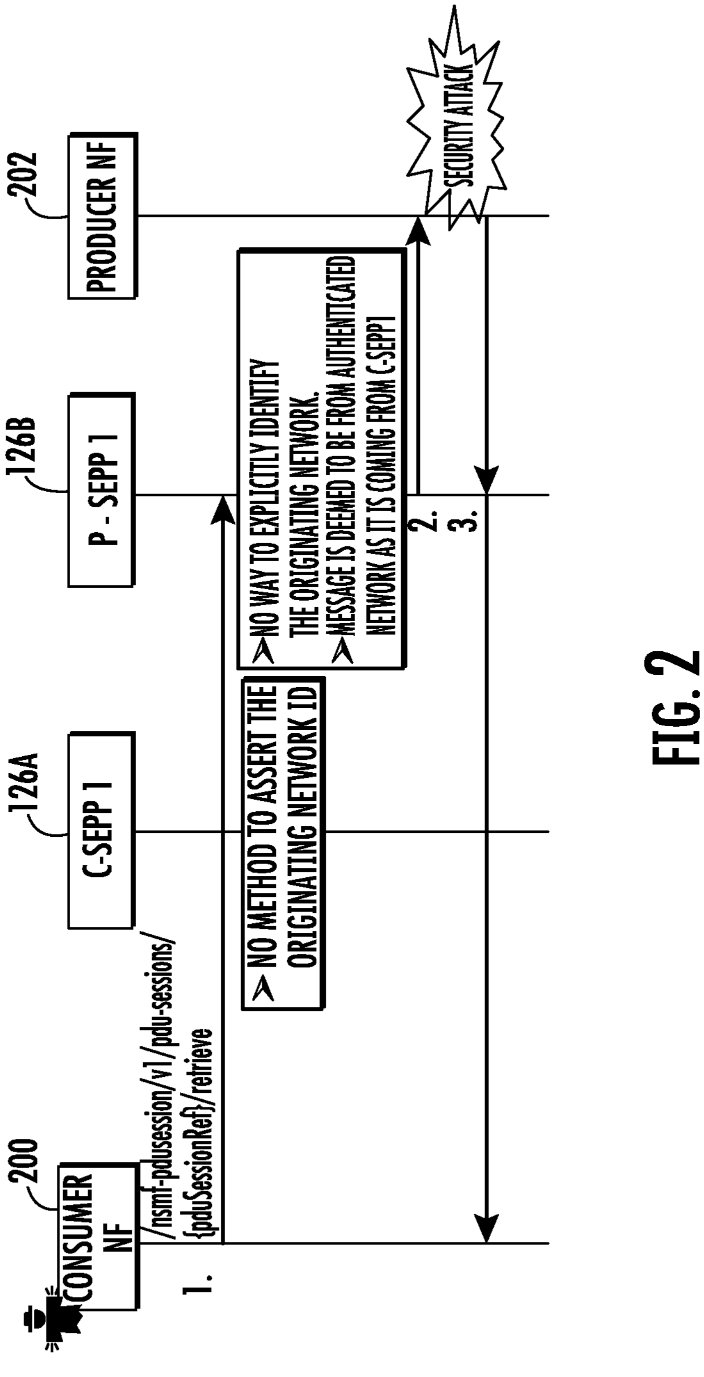
FIG. 2 is a message flow diagram illustrating exemplary messages that may be exchanged when a SEPP receives a message without a 3gpp-Sbi-Originating-Network-Id header.

As described above, one problem that can occur in 5G and other types of networks is that egress inter-PLMN SBI request messages that arrive at a proxy NF, such as an SCP or SEPP, may lack a 3gpp-Sbi-Originating-Network-Id header, and the proxy NF may be unable to determine originating network identification information that can be used to populate the 3GPP-Sbi-Originating-Network-Id header. FIG. 2 is a message flow diagram illustrating exemplary messages that may be exchanged when a SEPP receives a message without a 3gpp-Sbi-Originating-Network-Id header. Referring to FIG. 2, in step 1, a consumer NF 200 has been compromised by a hacker to generate and send an SBI request message without a 3GPP-Sbi-Originating-Network-Id header. Consumer NF 200 sends the request message to C-SEPP 126A. C-SEPP 126A receives the message, is unable to determine the identity of the originating network associated with the message and forwards the message to a P-SEPP 126B. P-SEPP 126B is unable to adequately screen the message because the message lacks a 3gpp-Sbi-Originating-Network-Id header. P-SEPP 126B in this example accepts the message because the message is from C-SEPP 126A with which P-SEPP 126B has an authenticated transport layer security (TLS) connection. In step 2, P-SEPP 126B forwards the message to a producer NF 202. Producer NF 202 receives the message, processes the message, and generates and sends a response message in step 3. The message may be part of a security attack to obtain information from producer NF 202 or to waste the processing resources of producer NF 202.

To address these and other problems, a proxy NF, such as an SCP or a SEPP that serves multiple PLMNs, may receive egress inter-PLMN SBI request messages, i.e., those destined for a PLMN not served by the proxy NF, without 3gpp-Sbi-Originating-Network-Id headers. For each of such messages, the proxy NF may attempt to determine originating network information, if successful, add a 3gpp-Sbi-Originating-Network-Id header, and populate the header with the originating network information. Because the proxy NF serves multiple PLMNs, the proxy NF must determine or select the network identifier of one of the PLMNs served by the proxy NF to include in the SBI request message.

Figure 3:
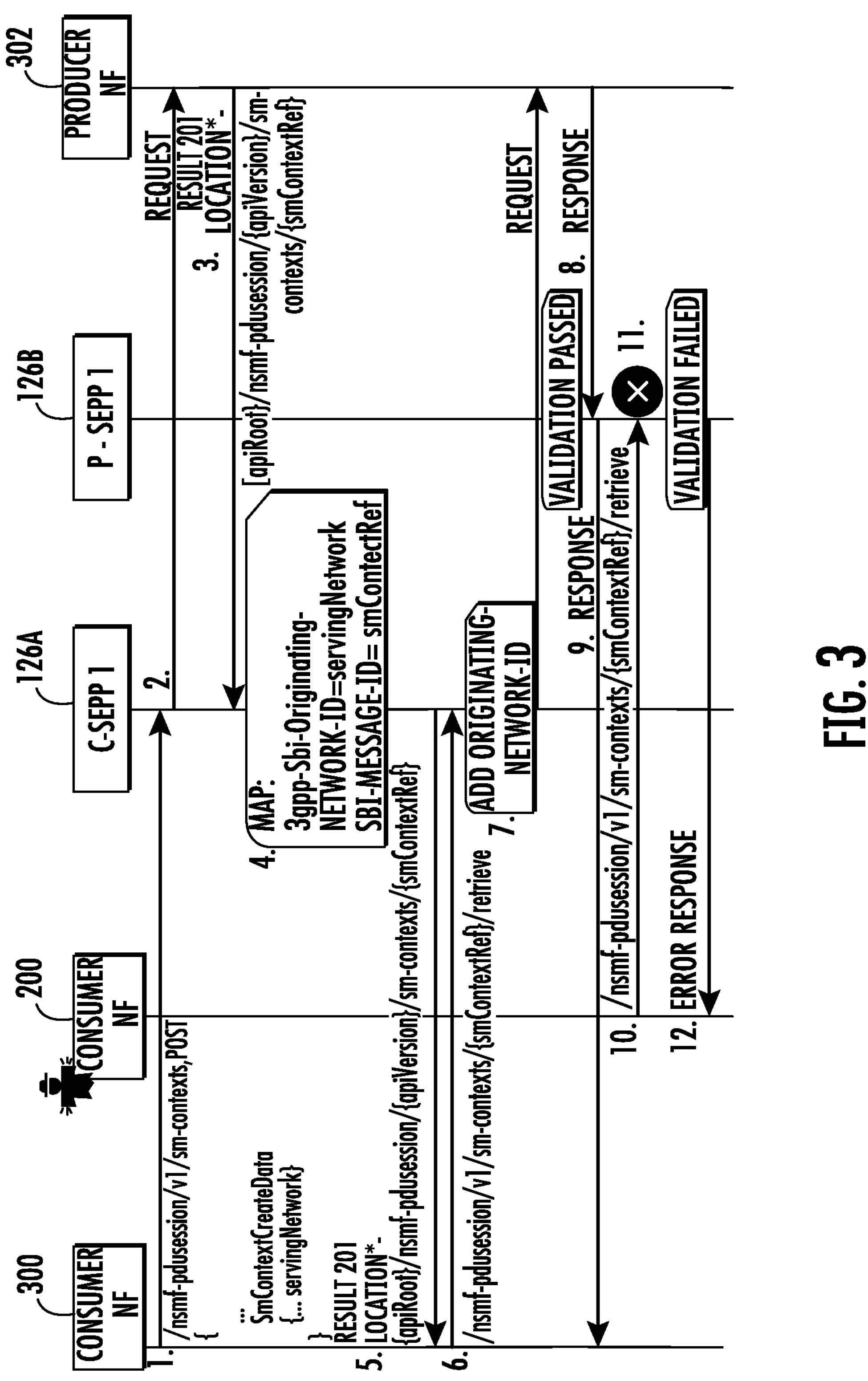
FIG. 3 is a message flow diagram illustrating exemplary messages that may be exchanged when an originating SEPP receives a message without a 3gpp-Sbi-Originating-Network-Id header, determines originating network identification information using a stored mapping between the originating network identification information and a dynamically assigned SBI message identifier, adds a 3gpp-Sbi-Originating-Network-Id header to the message, populates 3gpp-Sbi-Originating-Network-Id header with the originating network identification information, and forwards the message to the P-SEPP.

In one example, the proxy NF creates database records that map originating network identifiers to dynamically assigned SBI message identifiers and uses the records to determine originating network identification information for received messages. FIG. 3 is a message flow diagram illustrating exemplary messages that may be exchanged when an originating SEPP receives a message without a 3gpp-Sbi-Originating-Network-Id header, determines originating network identification information using a stored mapping between the originating network identification information and a dynamically assigned SBI message identifier, adds a 3gpp-Sbi-Originating-Network-Id header to the message, populates the 3gpp-Sbi-Originating-Network-Id header with the originating network identification information, and forwards the message to the P-SEPP. Referring to FIG. 3, in step 1 consumer NF 300 sends an SBI request message to C-SEPP 126A. The SBI request message includes serving network identification information in the SmContextCreateData in the message. However, the message lacks a 3gpp-Sbi-Originating-Network-Id header. In step 2, C-SEPP 126A adds a 3gpp-Sbi-Originating-Network-Id header to the message, populates the 3gpp-Sbi-Originating-Network-Id header with the serving network identification information obtained from SmContextCreateData in the message, stores the serving network identification information in a database record, and forwards the message to producer NF 302.

In step 3, producer NF 302 generates and sends a response to the request in step 2. The response includes an SMContextReference which is dynamically assigned to the PDU session. In step 4, C-SEPP 126A receives the message, obtains the SMContextRef value from the message and stores the SMContextRef value as an SBI message identifier in the database record that includes the serving network identifier, thereby creating a mapping between the SBI message identifier and the serving network identifier. In step 5, C-SEPP 126A forwards the response to consumer NF 300.

In step 6, consumer NF 300 sends an SBI request message to C-SEPP 126A. The SBI request message includes a smContextRef attribute that contains the dynamically assigned SBI message identifier. In step 7, C-SEPP 126A receives the message and uses the SBI message identifier to perform a lookup and determine the originating network ID for the message based on the stored mapping. C-SEPP 126A adds a 3gpp-Sbi-Originating-Network-Id header to the message and populates the header with the originating network information obtained from the mapping. C-SEPP 126A forwards the message to P-SEPP 126B. P-SEPP 126B screens the message based on the 3gpp-Sbi-Originating-Network-Id header, and the message passes the screening. Accordingly, P-SEPP 126B forwards the message to producer NF 302. In step 8, producer NF 302 generates and sends a response message to consumer NF 300 via P-SEPP 126B. In step 9, P-SEPP 126B sends the response to consumer NF 300.

In step 10, compromised consumer NF 200 generates and sends an SBI request message to C-SEPP 126A. C-SEPP 126A receives the message and performs a lookup using an SBI message identifier obtained from the pduSessionRef attribute in the message to determine the originating network identification information. C-SEPP 126A does not have a mapping that maps the smContextRef to an originating network identifier. Accordingly, C-SEPP 126A does not add a 3gpp-Sbi-Originating-Network-Id header to the message. C-SEPP 126A forwards the message to P-SEPP 126B. In step 11, P-SEPP 126B blocks the message because validation of the message fails due to the lack of the 3gpp-Sbi-Originating-Network-Id header. In step 12, P-SEPP 126B sends the error response to consumer NF 200.

Figure 4:
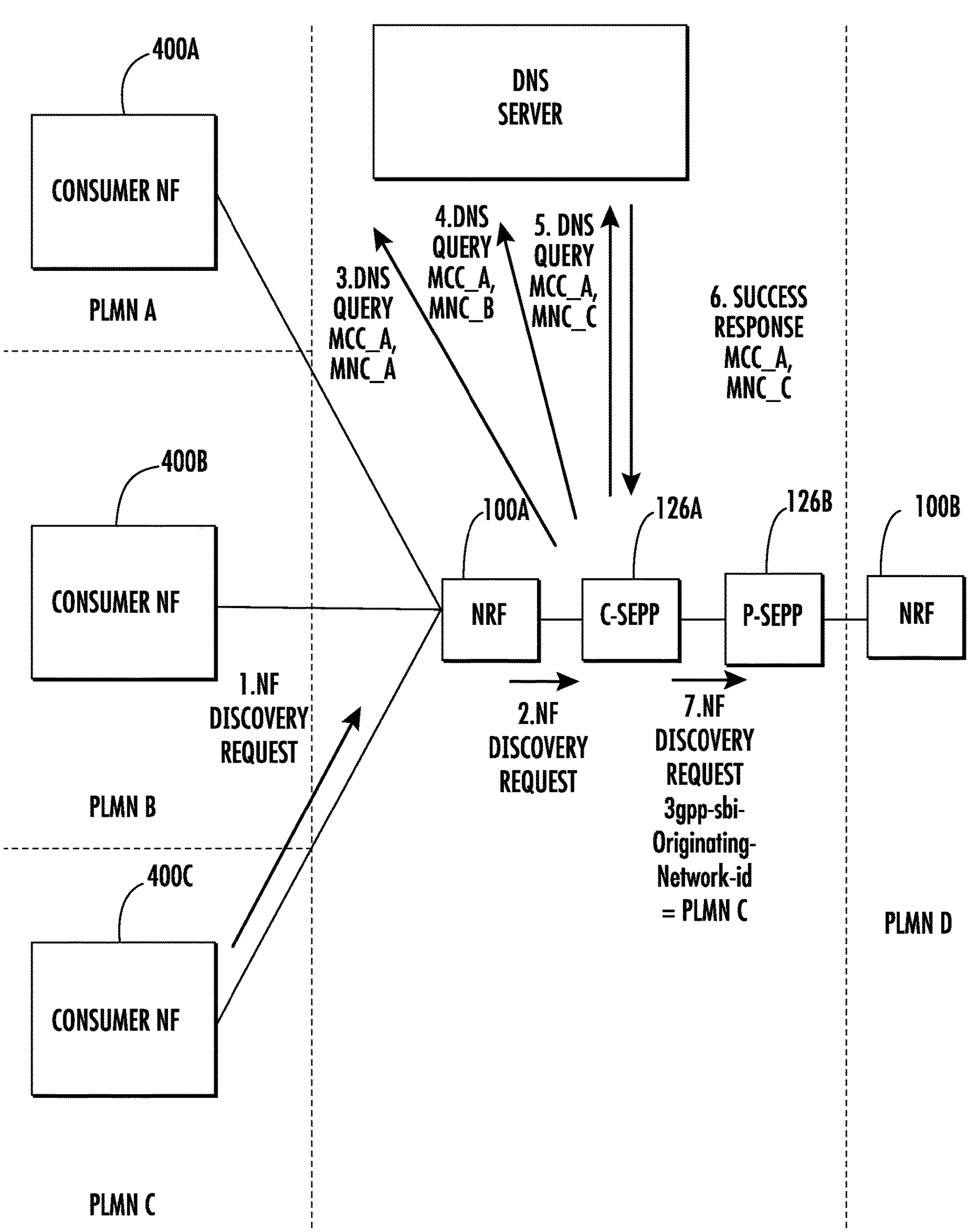
FIG. 4 is a message flow diagram illustrating exemplary messages that may be exchanged when an originating SEPP receives a message without a 3gpp-Sbi-Originating-Network-Id header, determines originating network identification information using the domain name system (DNS), adds a 3gpp-Sbi-Originating-Network-Id header to the message, populates the 3gpp-Sbi-Originating-Network-Id header with the originating network identification information, and forwards the message to the target SEPP.

In the example illustrated in FIG. 3, C-SEPP 126A receives a message with an SBI message identifier, uses the SBI message identifier to access a database record that maps the SBI message identifier to originating network information and uses the originating network information to populate a 3gpp-Sbi-Originating-Network-Id header. Some message types, such as NF discovery requests, do not include originating network identifiers or SBI message identifiers. An NF discovery request is an example of such a message type. FIG. 4 is a message flow diagram illustrating exemplary messages that may be exchanged when a SEPP receives a message without a 3GPP-Sbi-Originating-Network-Id header, determines originating network identification information using the domain name system (DNS), adds a 3GPP-Sbi-Originating-Network-Id header to the message, and populates the 3GPP-Sbi-Originating-Network-Id header with the originating network identification information. Referring to FIG. 4, consumer NFs 400A, 400B, and 400C respectively reside in PLMN A, PLMN B, and PLMN C. NRF 100A serves PLMN A, PLMN B, and PLMN C. C-SEPP 126A serves PLMN A, PLMN B, and PLMN C. P-SEPP 126B serves PLMN D in which NRF 100B resides.

In the message flow in FIG. 4, in step 1, consumer NF 400C located in PLMN-C generates and sends an NF discovery request to serving NRF 100A. In step 2, serving NRF 100A determines that the NF discovery request is directed to another PLMN and sends the NF discovery request to C-SEPP 126A. C-SEPP 126A receives the NF discovery request and determines that the message lacks a 3gpp-Sbi-Originating-Network-Id header, originating network information, and an SBI message identifier. In this case, C-SEPP 126A queries DNS server 400 repeatedly using different combinations of mobile country code (MCC) and mobile network code (MNC) of the networks that C-SEPP 126A serves. C-SEPP 126A formulates the DNS queries using a 3GPP-defined format to specify the FQDN of the NRF that is the subject of the query. In the illustrated example, in step 3, C-SEPP 126A sends a DNS query to DNS server 400 requesting an IP address corresponding to the FQDN nrf.5gc.mnc<MNC_A>.mcc<MCC_A>0.3gppnetwork.org, which corresponds to PLMN A. In steps 4 and 5, C-SEPP 126A constructs and sends similar DNS queries for the IP address of NRF 100A using the PLMN IDs for PLMNs B and C. In this example, it is assumed that NRF 100A uses the PLMN ID for PLMN C. DNS server 400 receives the queries, determines that DNS records do not exist for the NRF using the PLMN identifiers (MCC+MNC) for PLMNs A and B. Accordingly, DNS server 400 may return error responses (not shown in FIG. 4) for the DNS queries in steps 3 and 4. DNS server 400 determines that DNS server 400 has a DNS record for the NRF using the PLMN identifier for PLMN C and, in step 6, responds to the DNS query in step 5 with a success response including the IP address NRF 100A.

C-SEPP 126A receives the DNS success response in step 6 and determines, based on the receipt of the success response, that the MCC and MNC corresponding to PLMN-C is a valid originating network identifier. Accordingly, in step 7, C-SEPP 126A adds a 3gpp-Sbi-Originating-Network-Id header to the NF discovery request, populates the 3gpp-Sbi-Originating-Network-Id header with the identifier for PLMN C, and forwards the NF discovery request to P-SEPP 126B. P-SEPP 126B receives the NF discovery request, reads the contents of the 3gpp-Sbi-Originating-Network-Id header, and screens or validates the message based on the contents of the header. If the message passes the validation, P-SEPP 126B forwards the message to NRF 100B in PLMN D. If the message fails the validation, P-SEPP 126B may block the message from entering PLMN D and send an error response.

Figure 5:
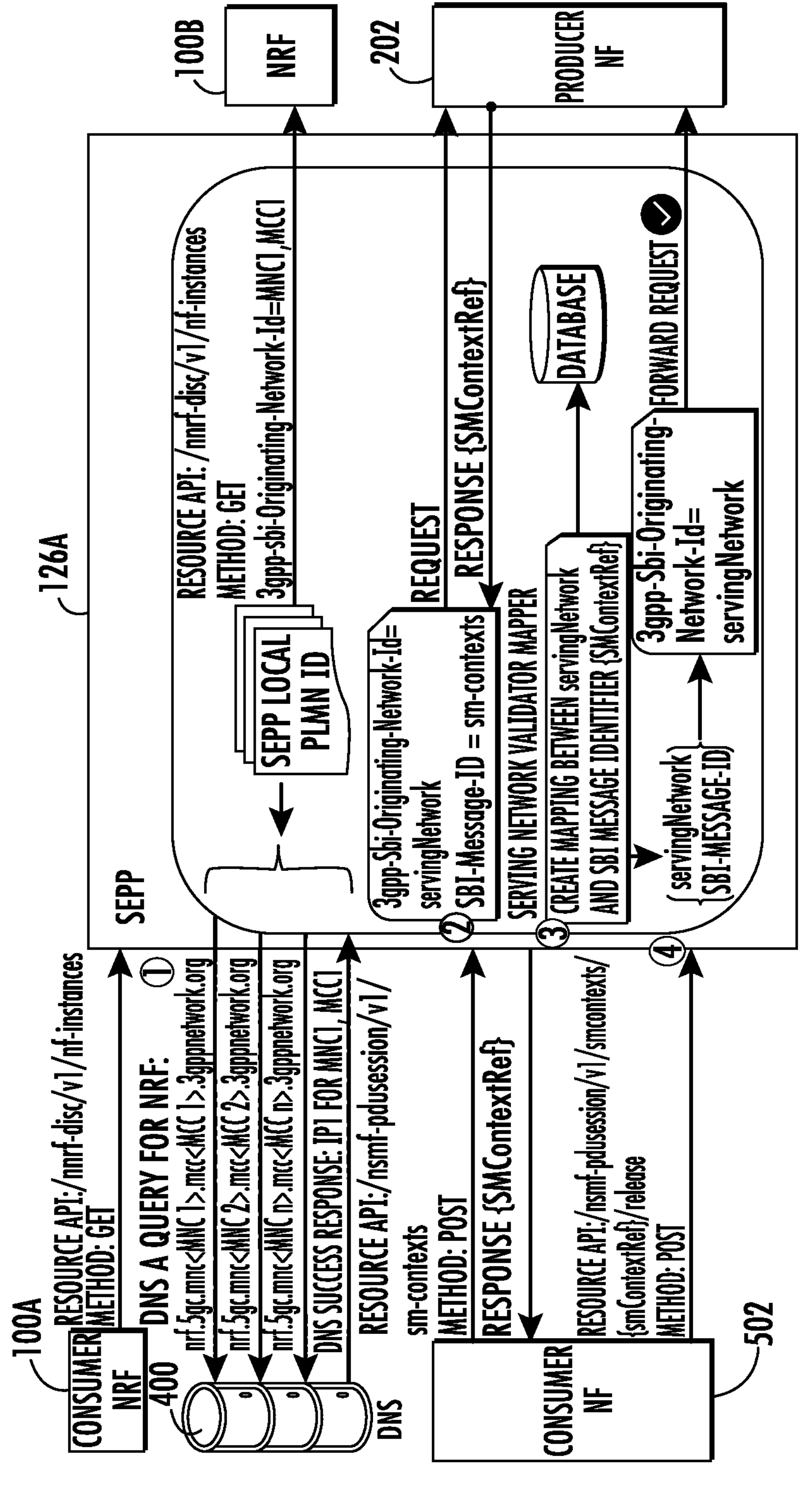
FIG. 5 is a block diagram illustrating operations performed by a SEPP in processing messages without 3gpp-Sbi-Originating-Network-Id headers.

FIG. 5 is a block diagram illustrating operations performed by a SEPP in processing messages without 3gpp-Sbi-Originating-Network-Id headers. In FIG. 5, step 1 illustrates the operations performed by SEPP 126A in receiving and processing an NF discovery request without a 3gpp-Sbi-Originating-Network-Id header. Steps 2 and 3 illustrate operations performed by SEPP 126A in receiving an SBI request without a 3gpp-Sbi-Originating-Network-Id header and creating a database record that maps an SBI message identifier to an originating network identifier. Step 4 illustrates SEPP 126A using the mapping created in steps 2 and 3 to add a 3gpp-Sbi-Originating-Network-Id header to an egress SBI request message.

Returning to step 1 in FIG. 5, SEPP 126A receives an NF discovery request from consumer NRF 100A. SEPP 126A sends queries to DNS server 400 for the IP address of each serving PLMN ID of the PLMNs that SEPP 126A serves. SEPP 126A receives a DNS success response in response to one of the queries and stores the PLMN ID of the query corresponding to the success response as the originating network ID to use in the NF discovery request. SEPP 126A adds a 3gpp-Sbi-Originating-Network-Id header to the NF discovery request, populates the header with the PLMN ID identified using DNS (i.e., from the MCC+MNC combination from the DNS query that resulted in a success response from DNS server 400), and forwards the NF discovery request to NRF 100B located in the target PLMN. A P-SEPP (not shown in FIG. 5) may utilize contents of the 3gpp-Sbi-Originating-Network-Id header to determine whether to allow the NF discovery request into the PLMN protected by the P-SEPP.

In step 2, SEPP 126A receives an SBI request from consumer NF 502. SEPP 126A obtains serving network identification information from the message, e.g., from the SmContextCreateData of the message, stores the originating network identification information in a database record, adds a 3gpp-Sbi-Originating-Network-Id header to the message, populates the header with the serving network identifier, and forwards the message to producer NF 202. Producer NF 202 receives the request message, generates a response including an smContextRef value, and forwards the response to SEPP 126A. SEPP 126A receives the response, reads the smContextRef from the response, and stores the value of the smContextRef as an SBI message identifier in the same database record created to store the originating network identifier from the request message, thereby creating a mapping between the SBI message identifier and the originating network identifier. In step 4, consumer NF 502 sends an sm-contexts release request to SEPP 126A. SEPP 126A uses the SBI message ID from the message to perform a lookup and locate a mapping that identifies the serving network identifier. SEPP 126A adds a 3gpp-Sbi-Originating-Network-Id header to the message, populates the 3gpp-Sbi-Originating-Network-Id header with the serving network identifier, and forwards the message to producer NF 202.

In summary, SBI request messages, such as /nnrf-disc/v1/nf-instances, Method=GET, do not carry the serving network ID as a mandatory field. Responsive to receiving the NF discovery request, C-SEPP 126A will query DNS server 400 for the local NRF with a 3gpp-defined inter-PLMN format, e.g., nrf.5gc.mnc<MNC1>.mcc<MCC1>0.3gppnetwork.org using a local list of PLMN IDs in the MCC and MNC fields. The combination of MCC and MNC which resolves into a successful DNS response will be used as the PLMN ID to populate the 3gpp-Sbi-Originating-Network-Id header.

Other types of request messages, such as:

/nsmf-pdusession/v1/smcontexts/{smContextRef}/retrieve, do not contain a serving network identifier. For such messages, SEPP 126A can retrieve the serving network ID from a previously received SBI request message like /nsmf-pdusession/v1/sm-contexts, Method=POST and map the serving network identifier to an SBI message identifier (smContextRef), which gets assigned in the location header of the response message of /nsmf-pdusession/v1/sm-contexts. An example of the location header is as follows:

$$\text{Location}^{*}: \{\text{apiRoot}\}/\text{nsmfpdusession}/ \{\text{apiVersion}\}/sm\text{-contexts}/\{\text{smContextRef}\}.$$

Subsequently, when SEPP 126A receives the following SBI request message:

$$/nsmf\text{-pdusession}/v1/\text{smcontexts}/\{\text{smContextRef}\}/\text{retrieve}, \text{Method} = \text{POST},$$

SEPP 126A reads the SBI message identifier (smContextRef) and determines whether the SBI message identifier matches with a stored mapping of the SBI message identifier and the serving network identifier. SEPP 126A will use the serving network identifier that is mapped to the SBI message identifier to populate the 3gpp-Sbi-Originating-Network-Id header of the egress SBI request message. If SEPP 126A fails to locate a database entry that maps the SBI message identifier to a serving network identifier, SEPP 126A may forward the SBI request message to its intended destination without adding a 3gpp-Sbi-Originating-Network-Id header.

Figure 6:
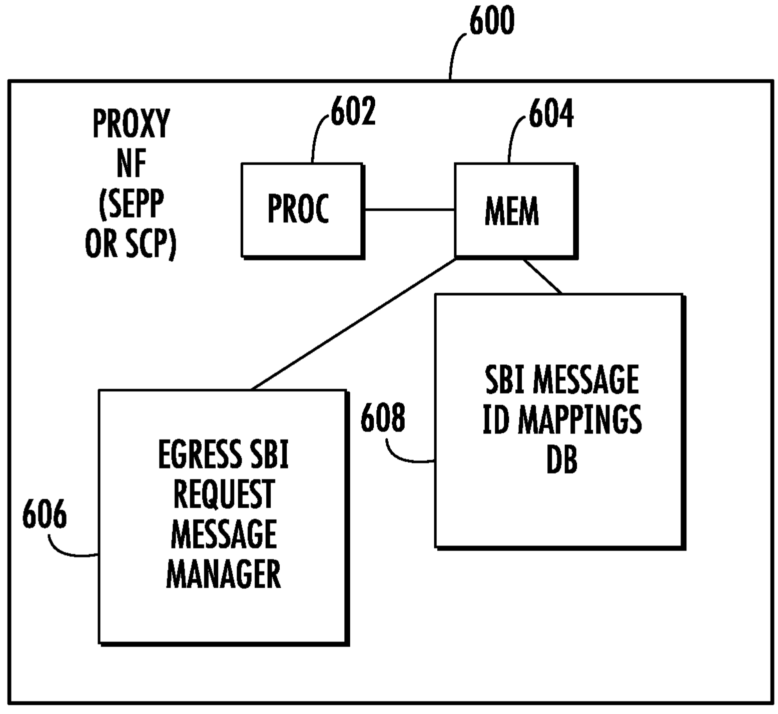
FIG. 6 is a block diagram illustrating an exemplary architecture for a proxy NF capable of processing an ingress SBI request message without a 3gpp-Sbi-Originating-Network-Id header.

FIG. 6 is a block diagram illustrating an exemplary architecture for a proxy NF capable of processing an ingress SBI request message without a 3GPP-Sbi-Originating-Network-Id header. Referring to FIG. 6, proxy NF 600 may be an SCP or a SEPP that includes at least one processor 602 and memory 604. Proxy NF 600 further includes an egress SBI request message manager 606 for detecting and processing egress messages without 3gpp-Sbi-Originating-Network-Id headers. Proxy NF 600 further includes an SBI message ID mappings database 608 that includes records that have mappings between SBI message identifiers and originating network identifiers. SBI message ID mappings database 608 may be automatically created by egress SBI request message manager 606 using dynamically assigned resource IDs obtained from messages transmitted by producer NFs in message flows such as that illustrated in FIG. 3. Egress SBI request message manager 606 may be implemented using computer executable instructions stored in memory 604 and executed by processor 602.

Figure 7:
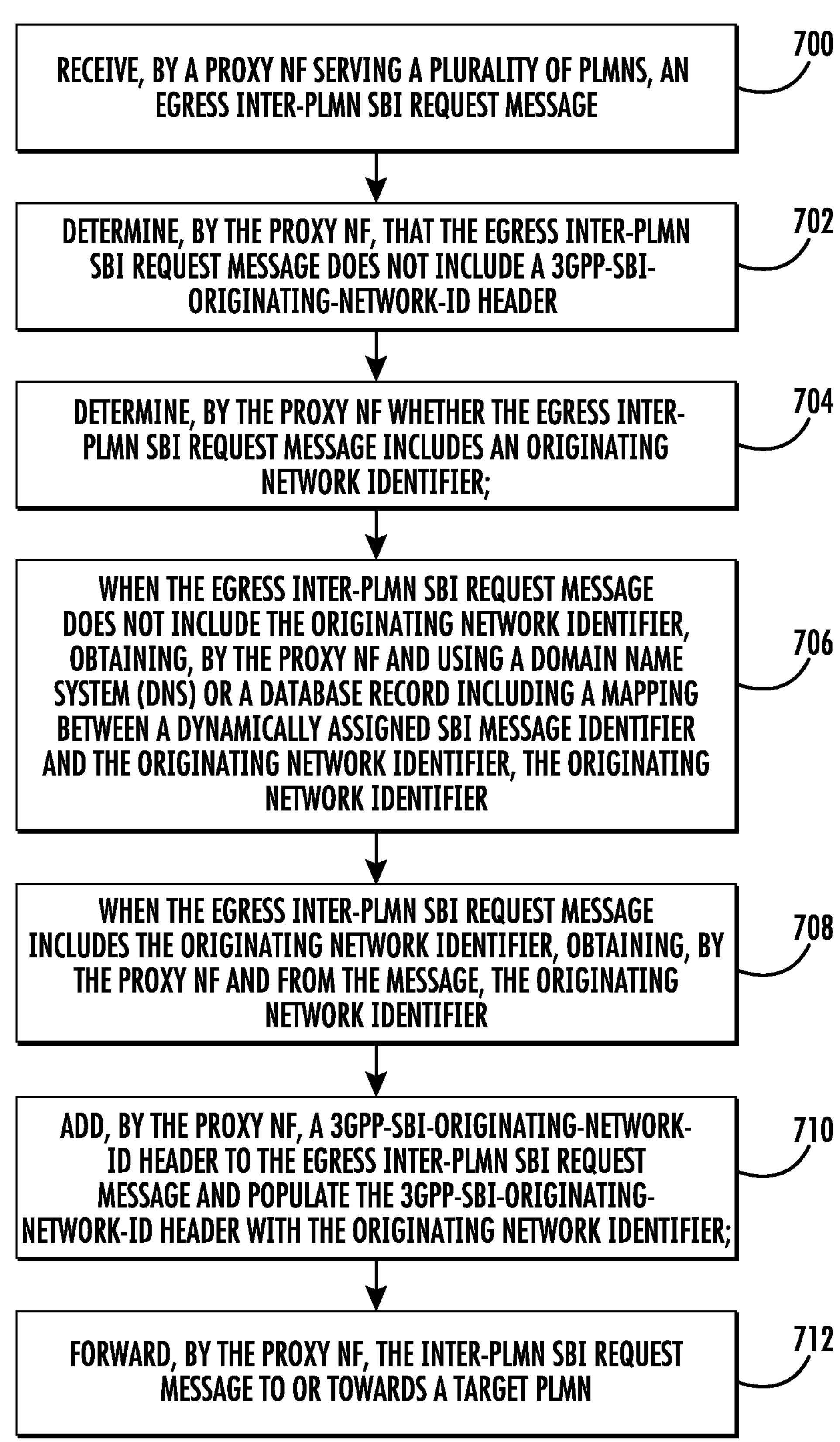
FIG. 7 is a flow chart illustrating an exemplary method for processing an ingress SBI request message without a 3gpp-Sbi-Originating-Network-Id header.

FIG. 7 is a flow chart illustrating an exemplary method for processing an ingress SBI request message without a 3GPP-Sbi-Originating-Network-Id header. Referring to FIG. 7, in step 700, the process includes receiving, by a proxy NF serving a plurality of PLMNs, an egress inter-PLMN SBI request message. For example, an originating or consumer SEPP, such as C-SEPP 126A, or an SCP may receive an SBI request message that is destined for a PLMN that is not served or protected by C-SEPP 126A.

In step 702, the process includes determining, by the proxy NF, that the egress inter-PLMN SBI request message does not include a 3gpp-Sbi-Originating-Network-Id header. For example, an originating or consumer SEPP, such as C-SEPP 126A, or an SCP may parse the received message and determine that the 3gpp-Sbi-Originating-Network-Id header is not present.

In step 704, the process includes determining, by the proxy NF, whether the egress inter-PLMN SBI request message includes an originating network identifier. For example, an originating or consumer SEPP, such as C-SEPP 126A, or an SCP may determine whether a received message has an originating network identifier (in a message field other than the 3gpp-Sbi-Originating-Network-Id header, which is not present).

In step 706, the process further includes, when the egress inter-PLMN SBI request message does not include the originating network identifier, obtaining, by the proxy NF and using a domain name system (DNS) or a database record including a mapping between a dynamically assigned SBI message identifier and the originating network identifier, the originating network identifier. For example, an originating or consumer SEPP, such as C-SEPP 126A, or an SCP may, for NF discovery requests, query DNS using the MCC and MNC combinations configured for the proxy NF, receive a success response to one of the DNS queries, and use the MCC and MNC combination as the serving network identifier. For received SBI request messages other than NF discovery requests, the proxy NF may parse each message to retrieve the SBI message identifier, use the SBI message identifier to perform a lookup in SBI message ID mappings database 608, locate a matching record, and read the serving network ID from the record.

In step 708, the process includes, when the egress inter-PLMN SBI request message includes the originating network identifier, obtaining, by the proxy NF and from the message, the originating network identifier. For example, when the proxy NF determines that the received SBI request message includes an originating network identifier in a field or header that is not the 3gpp-Sbi-Originating-Network-Id header, the proxy NF may use the identifier obtained from the message field as the originating network identifier.

In step 710, the process includes adding, by the proxy NF, a 3gpp-Sbi-Originating-Network-Id header to the egress inter-PLMN SBI request message and populating the 3gpp-Sbi-Originating-Network-Id header with the originating network identifier. For example, an originating or consumer SEPP, such as C-SEPP 126A, or an SCP may add the 3gpp-Sbi-Originating-Network-Id header to the message and populate the header with the originating network identifier determined using the methods in step 706 or 708.

In step 712, the process includes forwarding, by the proxy NF, the inter-PLMN SBI request message to or towards a target PLMN. For example, an originating or consumer SEPP, such as C-SEPP 126A, or an SCP may forward the inter-PLMN SBI request to or towards a target PLMN.

The entries in the following table illustrate examples of messages that do not include the serving network ID and some of which include dynamically assigned SBI message identifier that can be mapped to serving network identifiers.

TABLE 1

| Messages without Serving Network Identifiers | |
|---|---|
| Resource URI | HTTP Method |
| /nnrf-disc/v1/nf-instances | GET |
| /nsmf-pdusession/v1/sm-contexts/{smContextRef}/release | POST |
| /nsmf-pdusession/v1/pdu-sessions/{pduSessionRef}/retrieve | POST |
| /nsmf-pdusession/v1/pdu-sessions/{pduSessionRef}/transfer-mo-data | POST |
| /nudm-sdm/v2/{supi}/am-data/cag-ack | PUT |
| /nudm-sdm/v2/{supi}/ue-context-in-smf-data | GET |
| /nudm-sdm/v2/{supi}/ue-context-in-smsf-data | GET |
| /nudm-sdm/v2/{supi}/sdm-subscriptions/{subscriptionId} | PATCH |
| /nudm-sdm/v2/{supi}/am-data/sor-ack | PUT |
| /nudm-sdm/v2/{supi}/am-data/upu-ack | PUT |
| /nudm-sdm/v2/{supi}/am-data/subscribed-snssais-ack | PUT |
| /namf-comm/v1/subscriptions/{subscriptionId}, | PATCH, DELETE |
| /nudm-sdm/v2/{supi}/lcs-mo-data | GET |
| /nudm-sdm/v2/{ueId}/sdm-subscriptions/{subscriptionId} | PATCH, DELETE |
| /nudm-uecm/v1/{ueId}/registrations/smf-registrations/{pduSessionId} | DELETE |
| /nudm-uecm/v1/{ueId}/registrations/smsf-3gpp-access | DELETE |
| /nudm-uecm/v1/{ueId}/registrations/smsf-non-3gpp-access | DELETE |
| /npcf-am-policy-control/v1/policies/{polAssoId} | GET, DELETE, POST |
| /nausf-auth/v1/ue-authentications/{authCtxId}/5g-aka-confirmation | PUT |
| /nausf-auth/v1/ue-authentications/{authCtxId}/eap-session | PUT |
| npcf-ue-policy-control/v1/policies/{polAssoId} | GET, DELETE |

In Table 1, the left-hand column illustrates SBI resource URIs that are used to access services provided by producer NFs. For example, the second entry in Table 1 is /nsmf-pdusession/v1/sm-contexts/{smContextRef}/release, which is a resource URI sent from an AMF to an SMF along with an HTTP POST method to release an SM context resource for a PDU session. The value of the smContextRef attribute is an example of a dynamically assigned resource ID that can be used as an SBI message ID that can be mapped to an originating network ID. Other examples in Table 1 of message attributes that can be used as the SBI message ID include the {pduSessionRef}, {supi}, {subscriptionId}, {ueId}, {polAssoId}, and {authCtxId}. Any of these attributes can be mapped to a serving network identifier, which can be used to populate 3gpp-Sbi-Originating-Network-Id headers in the messages.

Exemplary advantages of the subject matter described herein include providing enhanced network security for messages in which the originating or serving network is not indicated. The subject matter described herein allows mobile network operators to resolve inter-operability issues between PLMNs by adding the 3gpp-Sbi-Originating-Network-Id header to outgoing SBI request messages. The subject matter described herein can be implemented at any suitable proxy node, including a non-hosted SEPP, a hosted-SEPP, a SEPP that functions as a roaming hub, and an SCP. A hosted SEPP is a SEPP hosted by an IP exchange (IPX) provider. A non-hosted SEPP is a SEPP operated by the same network operator that operates the PLMN. A roaming hub is an interconnection platform used to connect different mobile networks and is operated by a roaming hub provider.

The disclosure of each of the following references is hereby incorporated herein by reference in its entirety.

REFERENCES 1. 3rd Generation Partnership Project; Technical Specification Group Core Network and Terminals; 5G System; Network Function Repository Services; Stage 3 (Release 18) 3GPP TS 29.510 V18.4.0 (2023 September)
2. 3rd Generation Partnership Project; Technical Specification Group Services and System Aspects; Security architecture and procedures for the 5G System; Stage 2 (Release 18) 3GPP TS 33.501 V18.3.0 (2023 September)
3. 3rd Generation Partnership Project; Technical Specification Group Core Network and Terminals; 5G System; Technical Realization of Service Based Architecture; Stage 3 (Release 18) 3GPP TS 29.500 V18.3.0 (2023 September)
4. 3rd Generation Partnership Project; Technical Specification Group Core Network and Terminals; 5G System; Public Land Mobile Network (PLMN) Interconnection; Stage 3 (Release 18) 3GPP TS 29.573 V18.4.0 (2023 September)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for detecting and processing egress inter-public land mobile network (inter-PLMN) service-based interface (SBI) request messages without 3gpp-Sbi-Originating-Network-Id headers, the method comprising:

receiving, by a proxy NF serving a plurality of PLMNs, a first egress inter-PLMN SBI request message that lacks a 3gpp-Sbi-Originating-Network-Id header and that includes an originating network identifier;

adding, by the proxy NF, a 3gpp-Sbi-Originating-Network-Id header to the first egress inter-PLMN SBI request message, populating the 3gpp-Sbi-Originating-Network-Id header with the originating network identifier, forwarding the first egress inter-PLMN SBI request message, and storing the originating network identifier in a database record;

receiving, by the proxy NF, a response to the first egress inter-PLMN SBI request message, obtaining a dynamically assigned SBI message identifier from the response message, and storing the dynamically assigned SBI message identifier in the database record, thereby creating a mapping between the dynamically assigned SBI message identifier and the originating network identifier;

receiving, by the proxy NF, a second egress inter-PLMN SBI request message lacking a 3gpp-Sbi-Originating-Network-Id header and including the dynamically assigned SBI message identifier;

using, by the proxy NF, the dynamically assigned SBI message identifier in the second egress inter-PLMN SBI request message to perform a lookup in database, and obtaining, from the lookup, the originating network identifier;

adding, by the proxy NF, a 3gpp-Sbi-Originating-Network-Id header to the second egress inter-PLMN SBI request message and populating the 3gpp-Sbi-Originating-Network-Id header with the originating network identifier; and forwarding, by the proxy NF, the second egress inter-PLMN SBI request message to or towards a target PLMN.

2. The method of claim 1 comprising:

receiving, by the proxy NF, an egress inter-PLMN NF discovery request message;

determining that the egress inter-PLMN NF discovery request message does not include an originating network identifier; and obtaining, by the proxy NF, for the egress inter-PLMN NF discovery request message, and using a domain name system (DNS), an originating network identifier for the egress inter-PLMN NF discovery request message.

3. The method of claim 2 wherein obtaining the originating network identifier for the NF discovery request message using the DNS includes:

sending, by the proxy NF, a plurality of different DNS queries to a DNS server, where each of the DNS queries includes a network identifier of the PLMNs served by the proxy NF and an NF identifier; and receiving a success response to one of the queries and obtaining the originating network identifier includes treating the network identifier included in the query that resulted in the success response as the originating network identifier for the egress inter-PLMN NF discovery request message.

4. The method of claim 3 wherein the identifier for the NF included in the DNS queries includes an identifier for an NF repository function (NRF).

5. The method of claim 1 wherein receiving the first egress inter-PLMN SBI request message that includes the originating network identifier includes receiving the first egress inter-PLMN SBI request message that includes SmContextCreateData that includes the originating network identifier.

6. The method of claim 5 wherein:

obtaining the dynamically assigned SBI message identifier from the response message includes reading the an smContextRef attribute from the response message; and storing the SBI message identifier and the originating network identifier in the database in the database record includes storing the smContextRef attribute in the database record.

7. The method of claim 1 wherein the proxy NF comprises a security edge protection proxy (SEPP), a service communication proxy (SCP), or a roaming hub.

8. The method of claim 7 wherein the proxy NF comprises an originating SEPP and forwarding the second egress inter-PLMN SBI request message to or towards the target PLMN includes forwarding the second egress inter-PLMN SBI request message to a SEPP associated with the target PLMN.

9. A system for detecting and processing egress inter-public land mobile network (inter-PLMN) service-based interface (SBI) request messages without 3gpp-Sbi-Originating-Network-Id headers, the system comprising:

a proxy NF configured to serve a plurality of PLMNs and including at least one processor and a memory; and an egress SBI request message manager implemented by the at least one processor for:

receiving a first egress inter-PLMN SBI request message that lacks a 3gpp-Sbi-Originating-Network-Id header and that includes an originating network identifier;

adding a 3gpp-Sbi-Originating-Network-Id header to the first egress inter-PLMN SBI request message, populating the 3gpp-Sbi-Originating-Network-Id header with the originating network identifier, forwarding the first egress inter-PLMN SBI request message, and storing the originating network identifier in a database record;

receiving a response to the first egress inter-PLMN SBI request message, obtaining a dynamically assigned SBI message identifier from the response message, and storing the dynamically assigned SBI message identifier in the database record, thereby creating a mapping between the dynamically assigned SBI message identifier and the originating network identifier;

receiving a second egress inter-PLMN SBI request message lacking a 3gpp-Sbi-Originating-Network-Id header and including the dynamically assigned SBI message identifier;

using the dynamically assigned SBI message identifier in the second egress inter-PLMN SBI request message to perform a lookup in database, and obtaining, from the lookup, the originating network identifier;

adding a 3gpp-Sbi-Originating-Network-Id header to the second egress inter-PLMN SBI request message and populating the 3gpp-Sbi-Originating-Network-Id header with the originating network identifier, and forwarding the second inter-PLMN SBI request message to or towards a target PLMN.

10. The system of claim 9 wherein the egress SBI request message manager is configured for:

receiving an egress inter-PLMN NF discovery request message;

determining that the egress inter-PLMN NF discovery request message does not include an originating network identifier; and obtaining the originating network identifier for the egress inter-PLMN NF discovery request message using a domain name system (DNS).

11. The system of claim 10 wherein, in obtaining the originating network identifier for the egress inter-PLMN SBI discovery request message using the DNS, the egress SBI request message manager is configured to:

send a plurality of different DNS queries to a DNS server, where each of the DNS queries includes a network identifier of the PLMNs served by the proxy NF and an NF identifier; and receive a success response to one of the queries and obtain the originating network identifier for the egress inter-PLMN NF discovery request message by treating the network identifier included in the query that resulted in the success response as the originating network identifier for the egress inter-PLMN NF discovery request message.

12. The system of claim 11 wherein the identifier for the NF included in the DNS queries includes an identifier for an NF repository function (NRF).

13. The system of claim 9 wherein the first egress inter-PLMN SBI request message includes SmContextCreateData that includes the originating network identifier.

14. The system of claim 13 wherein:

the dynamically assigned SBI message identifier from the response message comprises an smContextRef attribute.

15. The system of claim 9 wherein the proxy NF comprises a security edge protection proxy (SEPP), a service communication proxy (SCP), or a roaming hub.

16. A non-transitory computer readable medium having stored thereon executable instructions that when executed by a processor of a computer control the computer to perform steps comprising:

receiving, by a proxy network function (NF) serving a plurality of public land mobile networks (PLMNs), a first egress inter-PLMN service-based interface (SBI) request message that lacks a 3gpp-Sbi-Originating-Network-Id header and that includes an originating network identifier;

adding, by the proxy NF, a 3gpp-Sbi-Originating-Network-Id header to the first egress inter-PLMN SBI request message, populating the 3gpp-Sbi-Originating-Network-Id header with the originating network identifier, forwarding the first egress inter-PLMN SBI request message, and storing the originating network identifier in a database record;

receiving, by the proxy NF, a response to the first egress inter-PLMN SBI request message, obtaining a dynamically assigned SBI message identifier from the response message, and storing the dynamically assigned SBI message identifier in the database record, thereby creating a mapping between the dynamically assigned SBI message identifier and the originating network identifier;

receiving, by the proxy NF, a second egress inter-PLMN SBI request message lacking a 3gpp-Sbi-Originating-Network-Id header and including the dynamically assigned SBI message identifier;

using, by the proxy NF, the dynamically assigned SBI message identifier in the second egress inter-PLMN SBI request message to perform a lookup in database, and obtaining, from the lookup, the originating network identifier;

adding, by the proxy NF, a 3gpp-Sbi-Originating-Network-Id header to the second egress inter-PLMN SBI request message and populating the 3gpp-Sbi-Originating-Network-Id header with the originating network identifier; and forwarding, by the proxy NF, the second egress inter-PLMN SBI request message to or towards a target PLMN.

* * * * *